(12) United States Patent
Qiu

(10) Patent No.: US 10,582,176 B2
(45) Date of Patent: Mar. 3, 2020

(54) METHOD AND STRUCTURE FOR GENERATING PICTURE COMPENSATION SIGNAL, AND RESTORING SYSTEM

(71) Applicants: HKC Corporation Limited, Shenzhen, Guangdong (CN); Chongqing HKC Optoelectronics Technology Co., Ltd., Chongqing (CN)

(72) Inventor: Bin Qiu, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 97 days.

(21) Appl. No.: 15/745,426

(22) PCT Filed: Dec. 21, 2017

(86) PCT No.: PCT/CN2017/117653
§ 371 (c)(1),
(2) Date: Jan. 16, 2018

(87) PCT Pub. No.: WO2019/061882
PCT Pub. Date: Apr. 4, 2019

(65) Prior Publication Data
US 2019/0104294 A1    Apr. 4, 2019

(30) Foreign Application Priority Data

Sep. 26, 2017  (CN) .......................... 2017 1 0883989

(51) Int. Cl.
*H04N 1/56*    (2006.01)
*H04N 1/60*    (2006.01)
(Continued)

(52) U.S. Cl.
CPC ........... *H04N 9/735* (2013.01); *H04N 5/2351* (2013.01); *H04N 5/243* (2013.01); *H04N 9/793* (2013.01)

(58) Field of Classification Search
CPC combination set(s) only.
See application file for complete search history.

(56) References Cited

U.S. PATENT DOCUMENTS

2004/0196234 A1* 10/2004 Shiomi ................ G09G 3/3648
345/89
2013/0342585 A1* 12/2013 Chun ................... G09G 3/3208
345/690

(Continued)

*Primary Examiner* — Wesner Sajous

(57) ABSTRACT

This application relates to a method and a structure for generating a picture compensation signal, and a restoring system. A center luminance value is obtained by means of an image capturing device; then a grayscale percentage value is set by means of a calculating module, and luminance is adjusted according to the grayscale percentage value; a luminance value is obtained by means of the image capturing device according to the grayscale percentage value; a luminance difference value is obtained by means of a luminance difference detection module; and whether the luminance difference value is less than a default value is determined by a difference determining module; if the luminance difference value is less than the default value, a grayscale percentage value is reduced by the calculating module, and comparison again; and if the luminance difference value exceeds the default value, a sampling grayscale is obtained by a processing module.

16 Claims, 7 Drawing Sheets

(51) Int. Cl.
  *H04N 5/243* (2006.01)
  *H04N 5/57* (2006.01)
  *H04N 9/64* (2006.01)
  *H04N 9/77* (2006.01)
  *H04N 9/73* (2006.01)
  *H04N 9/793* (2006.01)
  *H04N 5/235* (2006.01)

(56) References Cited

U.S. PATENT DOCUMENTS

2018/0218690 A1* 8/2018 Zhou .................... G09G 3/3406
2018/0253852 A1* 9/2018 Zhang .................... G06T 7/181
2019/0052872 A1* 2/2019 Shyshkin .............. G01J 1/0228

* cited by examiner

METHOD AND STRUCTURE FOR GENERATING PICTURE COMPENSATION SIGNAL, AND RESTORING SYSTEM

BACKGROUND

Technical Field

This application relates to the field of display, and in particular, to a method and a structure for generating a picture compensation signal, and a restoring system.

Related Art

With rapid development of the display technical industry, liquid crystal displays have become mainstream products in recent years. Under the propel of user needs and industrial competition pressure, the liquid crystal displays have been widely used in electronic products in people's daily life, such as television sets, computers, mobile phones, and tablets, daily used by people, due to the advantages of having a high resolution and a high luminance, not having geometric distortion, and meanwhile having a small volume, a light weight, and a low power consumption. In addition, a panel display module is a main component of a liquid crystal display. The manufacturing process of the panel display module is complex and nearly one hundred of processes are needed; and therefore, various display defects may inevitably appear in the manufacturing process. A relatively common defect among the display defects is mura defect. The mura defect means different colors or difference in luminance sensed visually caused by various traces generated by unevenness in luminance of a display panel under the same light source and the same ground color. Whether there is mura in the display panel can be determined by switching the display panel to a black screen and other low grayscale screens in a darkroom and then observing from different angles to determine whether there are traces in the display screen. Such the traces may be horizontal stripes or stripes at an angle of 45°, may be a straightly-cut square block or a block appearing at a corner, or may be traces without a rule to follow at all. A display region where the various traces appear is generally referred to as mura. The mura brings about visual discomfort for people and severely influences and reduces the quality grade of the panel.

In recent years, with spread of 4K and 2K televisions, the mura phenomenon becomes severe, and the demura technology is raised to the occasion. At present, by using the technology, data to be compensated is calculated by comparing difference between luminance in other regions of a panel and that of a reference point, to finally achieve evenness in luminance of the whole panel. Expression of mura may vary with respect to luminance of different grayscales. Therefore, the demura at present is performed with respect to three fixed sampling grayscales, generally 10%, 30%, and 70%, and compensation values for the other grayscales are obtained through linear operation by using the three grayscales. However, because the mura has complex and varied states and some types of mura are obvious at some grayscales only, the algorithm using fixed grayscales at present may cause inaccurate compensation and poor effect.

The working principles of demura sampling at present are set for ease of use of a system, and a demura system does not distinguish the mura can be seen in which grayscale screen, but only photograph screens of three input grayscales of 10%, 30%, and 70% fixedly, to obtain compensation values in the three grayscales, respectively. Compensation values for the other intermediate grayscales are simply obtained through linear operation. The disadvantages of the method at present can also be predicted. If the mura of a display device can be seen in a grayscale from 30%, by using such the linear operation, not only a good compensation effect cannot be obtained, but also adverse effect is caused for low grayscales in which mura cannot be seen originally.

SUMMARY

To resolve the technical problem, this application provides a sampling grayscale of demura selected dynamically for a display, and a most precise compensation effect is achieved by detecting grayscales having relatively obvious mura and then setting the sampling grayscale according to the grayscales.

The objective of this application and the technical problem resolved thereby are implemented by using the following technical solution. A technology for dynamically selecting a sampling grayscale of demura provided in this application includes the following steps:

First, a highest grayscale center luminance value of an all-white screen, a lowest grayscale center luminance value of an all-black screen of a display device are obtained by means of an image capturing device; then a first grayscale percentage value is set by means of a calculating module, and luminance of the display device is adjusted according to the first grayscale percentage value; in addition, a first region luminance value of the display device is obtained by means of the image capturing device according to the first grayscale percentage value; a luminance difference value is obtained by means of a luminance difference detection module according to the highest grayscale center luminance value and the first region luminance value; and whether the luminance difference value is less than a default value is determined by means of a difference determining module. If the luminance difference value is less than the default value, a grayscale percentage value is reduced by means of the calculating module, and a second grayscale percentage value is obtained; and the first grayscale percentage value is replaced with the second grayscale percentage value by means of a processing module. If the luminance difference value exceeds the default value, finally the first grayscale percentage value is obtained as a first sampling grayscale by means of the processing module.

Then, a third grayscale percentage value is set by means of a calculating module, and the luminance of the display device is adjusted according to the third grayscale percentage value; a second region luminance value of the display device is obtained by means of the image capturing device according to the third grayscale percentage value; a luminance difference value is obtained by means of a luminance difference detection module according to the lowest grayscale center luminance value and the second region luminance value; and whether the luminance difference value is less than the default value is determined by means of the difference determining module. If the luminance difference value is less than the default value, a grayscale percentage value is increased by means of the calculating module and a third grayscale percentage value is obtained; and the second grayscale percentage value is replaced with the third grayscale percentage value by means of a processing module. If the luminance difference value exceeds the default value, the second grayscale percentage value is obtained as a second sampling grayscale by means of the processing module.

Finally, an intermediate sampling grayscale is obtained by means of the processing module according to the first sampling grayscale and the second sampling grayscale.

In an embodiment of this application, the display device may include, for example, a liquid crystal display, an OLED display, a micro-LED display, a laser display, a plasma display screen or other types of panel display devices.

In an embodiment of this application, the default value is a predefined value set according to a system or set independently by a user.

In an embodiment of this application, a grayscale percentage value reduced by means of the calculating module is a decrement set according to a system or set independently by a user.

In an embodiment of this application, if the luminance difference value is less than the default value, a grayscale percentage value is reduced by means of the calculating module and a second grayscale percentage value is obtained, to adjust the luminance of the display device; the second grayscale percentage value is used as the new first grayscale percentage value in replacement by means of the processing module; and after obtaining a region luminance value by means of the image capturing device and calculating the luminance difference value, whether the luminance difference value is less than the default value is determined again.

In an embodiment of this application, a grayscale percentage value increased by means of the calculating module is an increment set according to a system or set independently by a user.

In an embodiment of this application, if the luminance difference value is less than the default value, a grayscale percentage value is increased by means of the calculating module and a fourth grayscale percentage value is obtained, to adjust the luminance of the display device; the fourth grayscale percentage value is used as the new third grayscale percentage value in replacement by means of the processing module; and after obtaining a region luminance value by means of the image capturing device and calculating the luminance difference value, whether the luminance difference value is less than the default value is determined again.

The objective of this application and the technical problem resolved thereby may be further implemented by using the following technical measures. A structure for generating a picture compensation signal according to this application includes a calculating module, a luminance difference detection module, a difference determining module, and a processing module. The calculating module is configured to set a grayscale percentage value and adjust luminance of a display device; the luminance difference detection module is configured to obtain a luminance difference value according to a highest grayscale center luminance value and a corresponding region luminance value, and a lowest grayscale center luminance value and a corresponding region luminance value; the difference determining module is configured to determine whether the luminance difference value is less than a default value; and the processing module is configured to replace the grayscale percentage value, and obtain a first sampling grayscale, a second sampling grayscale, and an intermediate sampling grayscale according to the grayscale percentage value.

In an embodiment of this application, the luminance difference detection module is configured to obtain, by means of an image capturing device, a highest grayscale center luminance value of an all-white screen, a lowest grayscale center luminance value of an all-black screen, and a region luminance value of the display device.

In an embodiment of this application, the processing module obtains a compensation data value of demura according to the first sampling grayscale, the second sampling grayscale, and the intermediate sampling grayscale.

The objective of this application and the technical problem resolved thereby may be further implemented by using the following technical measures. A restoring system provided by this application is configured to provide a picture compensation signal to a display device. The restoring system includes an image capturing device configured to obtain a luminance value of the display device, a calculating structure configured to calculate a sampling grayscale, and the structure for generating a picture compensation signal.

By means of the technology for generating a picture compensation signal provided by this application, a most precise compensation effect is achieved by detecting grayscales having relatively obvious mura and then setting the sampling grayscale according to the grayscales.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions of the accompanying drawings. Therefore, the used terms about directions are used to describe and understand this application, and are not intended to limit this application.

The accompanying drawings and the description are considered to be essentially exemplary, rather than limitative. In figures, units with similar structures are represented by using a same reference number. In addition, for understanding and ease of description, a size and a thickness of each component shown in the accompanying drawings are arbitrarily shown, but this application is not limited thereto.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of a gravity direction.

To further describe the technical means adopted in this application to achieve the preset invention objective and effects thereof, specific implementations, structures, features, and effects of a method and structure for generating a picture compensation signal and a restoring system provided according to this application are described in detail below with reference to the drawings and preferred embodiments.

Figure 1:
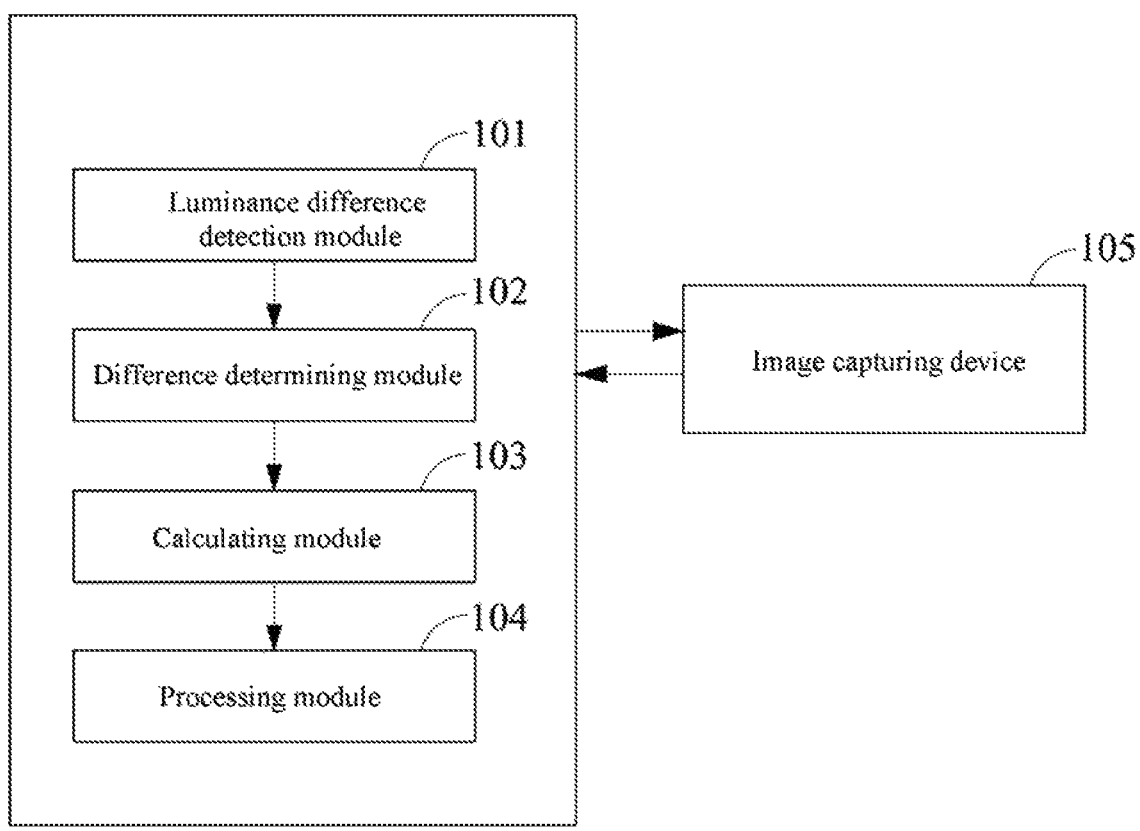
FIG. 1 is a schematic structural diagram according to an embodiment of this application.

FIG. 1 is a schematic structural diagram according to an embodiment of this application. As shown in FIG. 1, the structure for generating a picture compensation signal includes a luminance difference detection module 101, a difference determining module 102, a calculating module 103, and a processing module 104. The luminance difference detection module 101 obtains a luminance difference value according to a highest grayscale center luminance value and a corresponding region luminance value, and a lowest center luminance value and a corresponding region luminance value; the difference determining module 102 is configured to determine whether the luminance difference value is less than a default value; the calculating module 103 is configured to set a grayscale percentage value and adjust luminance of a display device; and the processing module 104 is configured to replace the grayscale percentage value and obtains a sampling grayscale, a second sampling grayscale, and an intermediate sampling grayscale according to the grayscale percentage value.

In an embodiment of this application, an image capturing device 105 is further included to obtain a partition luminance value of a display partition.

In an embodiment of this application, an image capturing device 105 is further included to obtain a highest grayscale center luminance value of an all-white screen, a lowest center luminance value of an all-black screen, and a region luminance value of the display device.

In an embodiment of this application, the display device may include, for example, a liquid crystal display, an OLED display, a micro-LED display, a laser display, a plasma display screen or other types of panel display devices.

In an embodiment of this application, the reference luminance value is a predefined value set according to a system or set independently by a user.

In an embodiment of this application, the default value is a predefined value set according to a system or set independently by a user.

In an embodiment of this application, if the luminance difference value is less than the default value, the display partition is an ideal luminance value and the compensation value is 0.

In an embodiment of this application, the compensation value is set to be 0 by the processing module, and is not calculated by means of the calculating module, so as to reduce the time for calculating the compensation value.

In an embodiment of this application, if the luminance difference value exceeds the default value, the calculating module calculates the compensation value, and the processing module adjusts the partition luminance value of a mura region.

Figure 2:
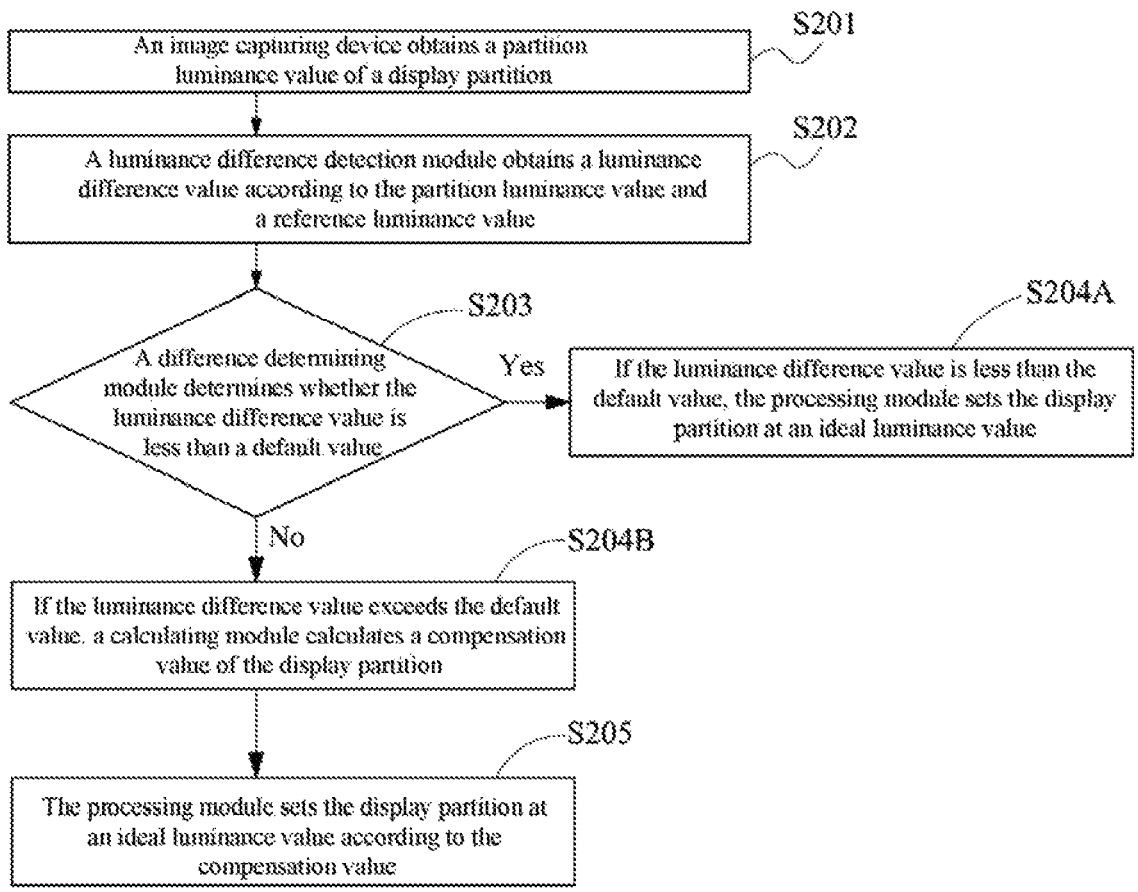
FIG. 2 is a flowchart of steps for generating a picture compensation signal according to an embodiment of this application.

FIG. 2 is a flowchart of steps for generating a picture compensation signal according to an embodiment of this application. As shown in FIG. 2, reference is made to the following description.

Step S201: An image capturing device obtains a partition luminance value of a display partition.

Step S202: A luminance difference detection module obtains a luminance difference value according to the partition luminance value and a reference luminance value.

Step S203: A difference determining module determines whether the luminance difference value is less than a default value.

Step S204A: If the luminance difference value is less than the default value, the processing module sets the display partition at an ideal luminance value.

Step S204B: If the luminance difference value exceeds the default value, a calculating module calculates a compensation value of the display partition.

Step S205: The processing module sets the display partition at an ideal luminance value according to the compensation value.

In an embodiment of this application, the reference luminance value is a predefined value set according to a system or set independently by a user.

In an embodiment of this application, the default value is a predefined value set according to a system or set independently by a user.

In an embodiment of this application, if the luminance difference value is less than the default value, the display partition is at the ideal luminance value and the compensation value is 0.

In an embodiment of this application, the compensation value is set to be 0 by the processing module, and is not calculated by means of the calculating module, so as to reduce the time for calculating the compensation value.

In an embodiment of this application, if the luminance difference value exceeds the default value, the calculating module calculates the compensation value, and the processing module adjusts the partition luminance value of a mura region.

Figure 3:
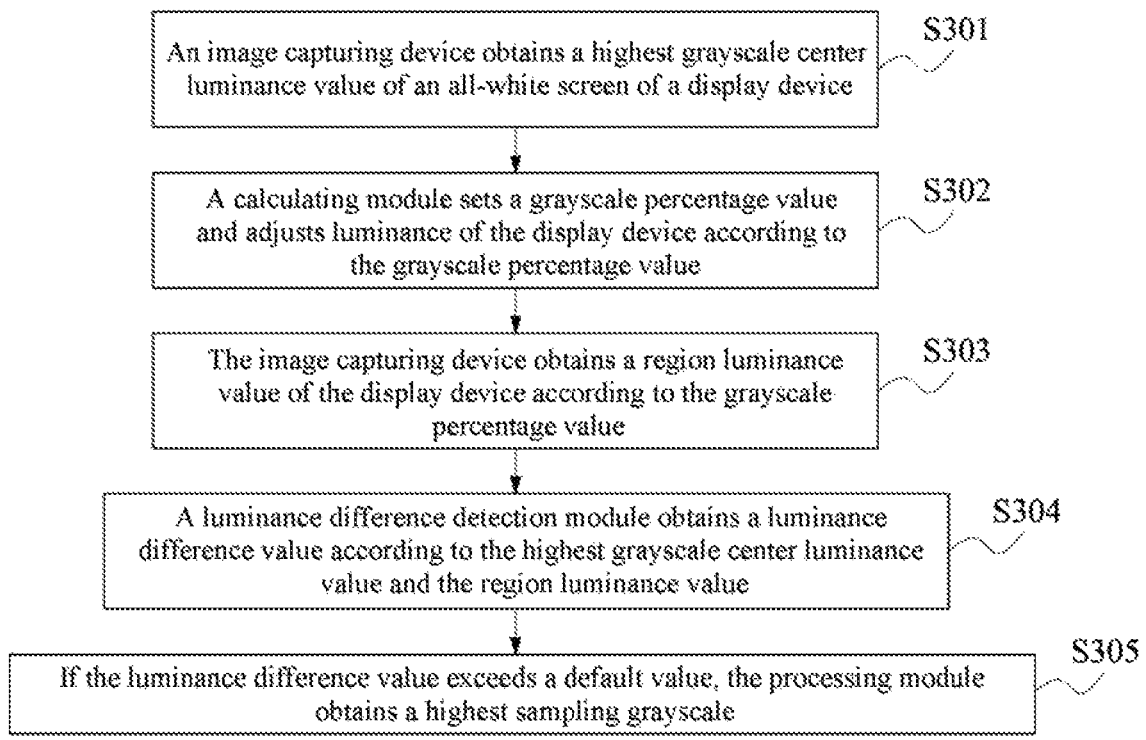
FIG. 3 is a flowchart of generating a picture compensation signal in a highest sampling grayscale according to an embodiment of this application.

FIG. 3 is a flowchart of generating a picture compensation signal in a highest sampling grayscale according to an embodiment of this application. As shown in FIG. 3, reference is made to the following description.

Step S301: An image capturing device obtains a highest grayscale center luminance value of an all-white screen of a display device.

Step S302: A calculating module sets a grayscale percentage value and adjusts luminance of the display device according to the grayscale percentage value.

Step S303: The image capturing device obtains a region luminance value of the display device according to the grayscale percentage value.

Step S304: A luminance difference detection module obtains a luminance difference value according to the highest grayscale center luminance value and the region luminance value.

Step S305: If the luminance difference value exceeds a default value, the processing module obtains a highest sampling grayscale.

In this embodiment, the default value is a predefined value set according to a system or set independently by a user.

In this embodiment, if the luminance difference value is less than the default value, the calculating module reduces the grayscale percentage value.

In this embodiment, the grayscale percentage value reduced by means of the calculating module is a decrement set according to a system or set independently by a user.

Figure 4:
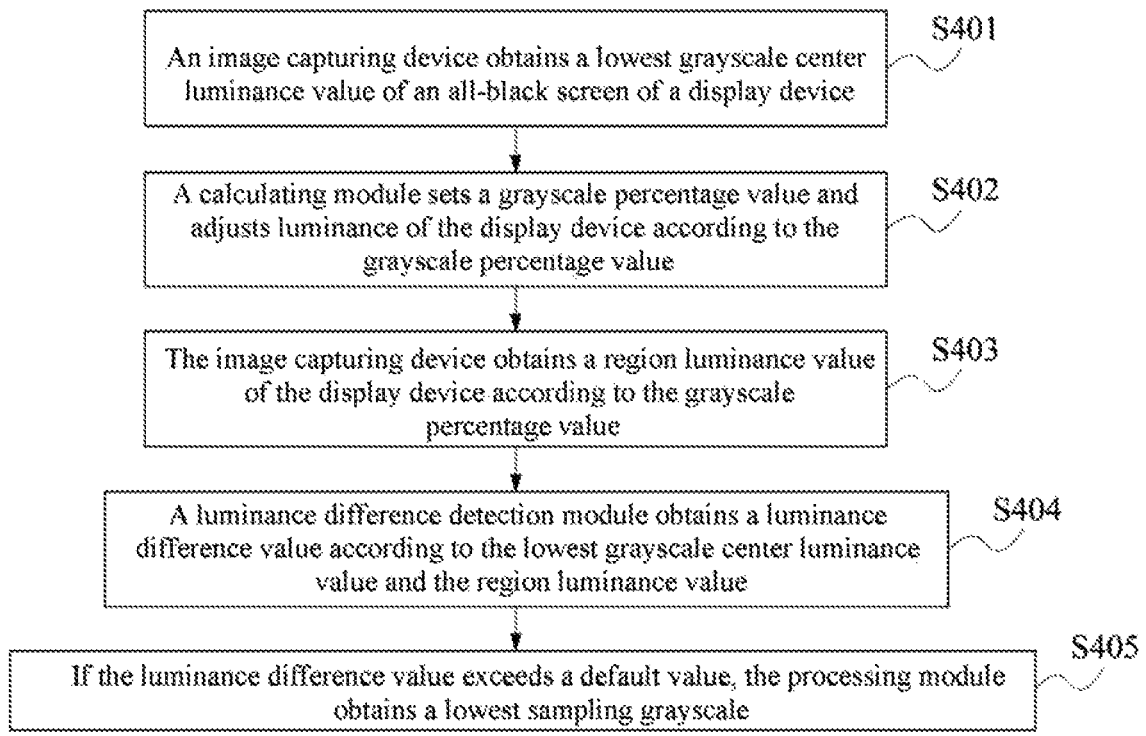
FIG. 4 is a flowchart of generating a picture compensation signal in a lowest sampling grayscale according to an embodiment of this application.

FIG. 4 is a flowchart of generating a picture compensation signal in a lowest sampling grayscale according to an embodiment of this application. As shown in FIG. 4, reference is made to the following description.

Step S401: An image capturing device obtains a lowest grayscale center luminance value of an all-black screen of a display device.

Step S402: A calculating module sets a grayscale percentage value and adjusts luminance of the display device according to the grayscale percentage value.

Step S403: The image capturing device obtains a region luminance value of the display device according to the grayscale percentage value.

Step S404: A luminance difference detection module obtains a luminance difference value according to the lowest grayscale center luminance value and the region luminance value.

Step S405: If the luminance difference value exceeds a default value, the processing module obtains a lowest sampling grayscale.

In this embodiment, the default value is a predefined value set according to a system or set independently by a user.

In this embodiment, if the luminance difference value is less than the default value, the calculating module increases the grayscale percentage value.

In this embodiment, the grayscale percentage value increased by means of the calculating module is an increment set according to a system or set independently by a user.

Figure 5:
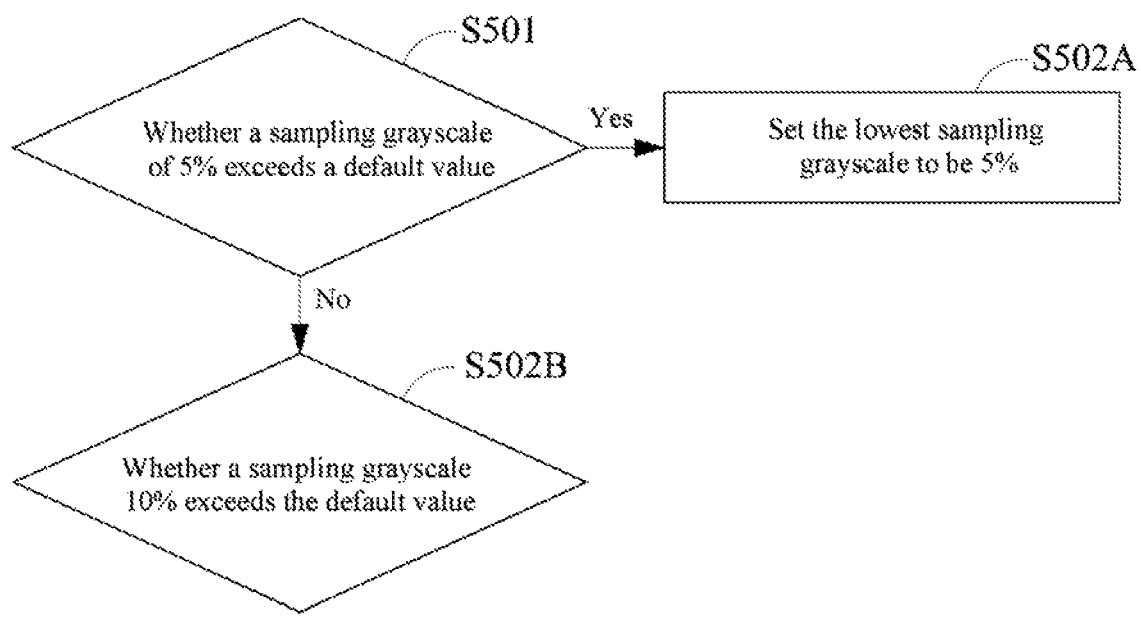
FIG. 5 is a determining flowchart of generating a picture compensation signal according to an embodiment of this application.

FIG. 5 is a determining flowchart of generating a picture compensation signal according to an embodiment of this application. As shown in FIG. 5, a lowest sampling grayscale is used as an example, and reference is made to the following description.

In this embodiment, an input sampling grayscale being 5% is used as an example. A calculating module sets a grayscale percentage value to be 5% and adjusts luminance of a display device according to the grayscale percentage value. In addition, an image capturing device photographs luminance of all regions of the display device and then compares the luminance with a lowest center luminance value (for example, step S501). If the luminance difference value exceeds a default value, the processing module obtains a lowest sample grayscale of 5% (for example, step S502A). If the luminance difference value is less than the default value, it is considered that there is not mura in a grayscale screen at the sampling grayscale of 5%. The processing module increases the grayscale percentage value, so that the sampling grayscale is 10% (for example, step S502B) and then comparison with the lowest center luminance value is performed again.

In this embodiment, the input sampling grayscale is 5%, the image capturing device photographs luminance of all regions of the display device and then compares the luminance with the lowest center luminance value. If the luminance difference is within the default value, it is determined that there is not mura in the grayscale screen at the sampling grayscale of 5%. Then detection is performed again by increasing the input sampling grayscale is increased to 10%. If it is detected that the luminance difference exceeds the default value at the sampling grayscale of 10%, it is determined that the sampling grayscale of 10% is a lowest grayscale having relatively obvious mura and it is set that the lowest sampling grayscale is the sampling grayscale of 10%. If the luminance difference is within the default value, the input sampling grayscale continues increasing. The increasing amplitude is set according to a system or set independently by a user. Detection for the high sampling grayscale is performed according to the same principles, to obtain a highest grayscale having a relatively obvious mura. If the highest grayscale having a relatively obvious mura is the sampling grayscale of 60%, the highest sampling grayscale is defined as 60%. An intermediate sampling grayscale is calculated according to system settings or user settings, and in this embodiment, the intermediate sampling grayscale is a half of the lowest grayscale and the highest grayscale. Three sampling grayscales of the display device sequentially are a sampling grayscale of 10%, a sampling grayscale of 35%, and a sampling grayscale of 60%.

In this embodiment, the default value is a predefined value set according to a system or set independently by a user.

In this embodiment, the grayscale percentage value increased by means of the calculating module is an increment set according to a system or set independently by a user.

In this embodiment, if the luminance difference value is less than the default value, the calculating module increases grayscale percentage value, to obtain a new grayscale percentage value, and adjust the luminance of the display device. The image capturing device obtains a new region luminance value, calculates a luminance difference value, and then determines whether the luminance difference value is less than the default value.

In this embodiment, the highest sampling grayscale is compared with a highest center luminance value. If the luminance difference value exceeds the default value, the processing module obtains the highest sampling grayscale. If the luminance difference value is less than the default value, it is considered that there is not mura in the grayscale screen at the obtained grayscale percentage value, the processing module reduces the grayscale percentage value, and comparison with the highest center luminance value is performed again.

Figure 6:
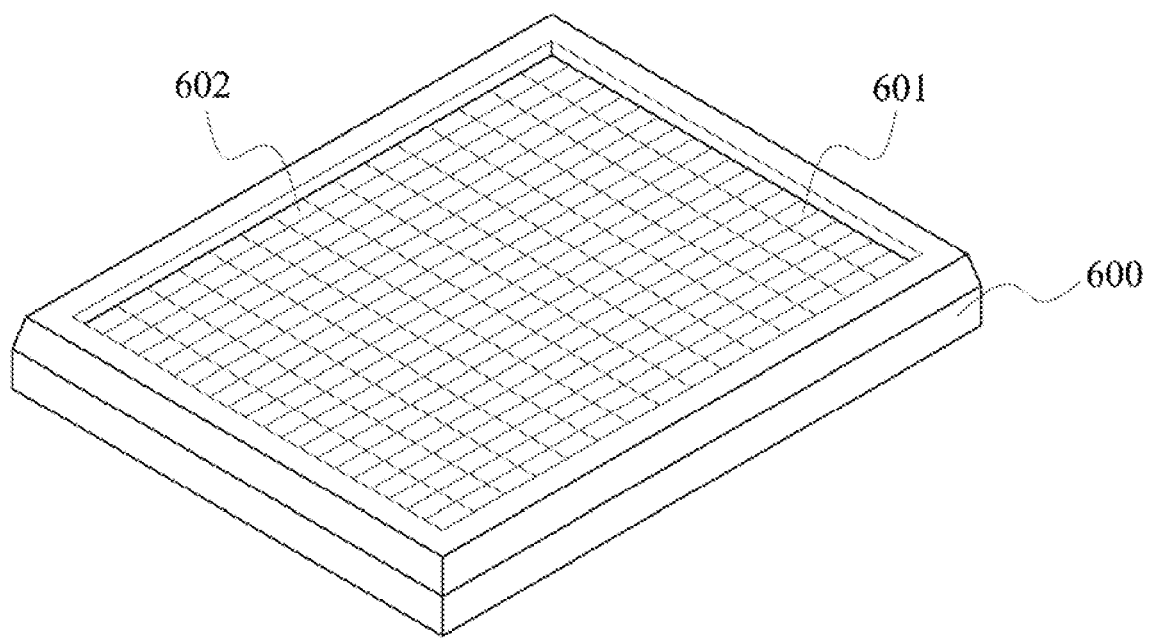
FIG. 6 is a schematic embodiment diagram of generating a picture compensation signal according to an embodiment of this application.

FIG. 6 is a schematic embodiment diagram of generating a picture compensation signal according to an embodiment of this application. As shown in FIG. 6, the image capturing device obtains a partition luminance value of a display partition 601 of a 4K display screen (Ultra HD; UHD) 600 and having a resolution of 3840*2160 pixels. The luminance difference detection module obtains a luminance difference value according to the partition luminance value and a reference luminance value. The difference determining module determines that the luminance difference value is less than a default value, indicative of the display partition 601 being a non-mura region. Likewise, the partition luminance value of a display partition 602 is obtained. The luminance difference detection module obtains a luminance difference value according to the partition luminance value and the reference luminance value. The difference determining module determines whether the luminance difference value exceeds the default value, indicative of the display partition 602 being a mura region. The calculating module calculates a compensation value of the display partition 602 and the processing module sets the luminance value in the display partition 602 as an ideal luminance value according to the compensation value.

In an embodiment of this application, by example of the existing demura technology mostly used in a 4K display screen (Ultra HD; UHD) having a resolution of 3840*2160 pixels, a current minimum compensation unit is 8*8 pixels. That is, one compensation point is obtained every eight pixels in both the horizontal direction and the vertical direction. By using the compensation point as a reference, compensation data for each pixel is obtained by mathematic operation in actual application. In the current method, a mura region and a non-mura region are not distinguished. Therefore, the total number of compensation points is 481*271, and compensation data for each point is 12 bits. Thus, the total amount of data to be calculated is 481*271*12=1.49 Megabyte (Mb).

In an embodiment of this application, if the luminance difference value is less than the default value, it indicates that the display partition 601 is a non-mura region, and calculation of a compensation value by means of the calculating module is not needed. The amount of calculation of the display partition 601 is 0, so that the amount of calculation for compensation data is further reduced.

In an embodiment of this application, the reference luminance value is a predefined value set according to a system or set independently by a user.

In an embodiment of this application, the default value is a predefined value set according to a system or set independently by a user.

In an embodiment of this application, if the luminance difference value is less than the default value, the display partition is at the ideal luminance value and the compensation value is 0.

In an embodiment of this application, the compensation value is set to be 0 by the processing module, and is not calculated by means of the calculating module, so as to reduce the time for calculating the compensation value.

In an embodiment of this application, if the luminance difference value exceeds the default value, the calculating module calculates the compensation value, and the processing module adjusts the partition luminance value of a mura region.

Figure 7:
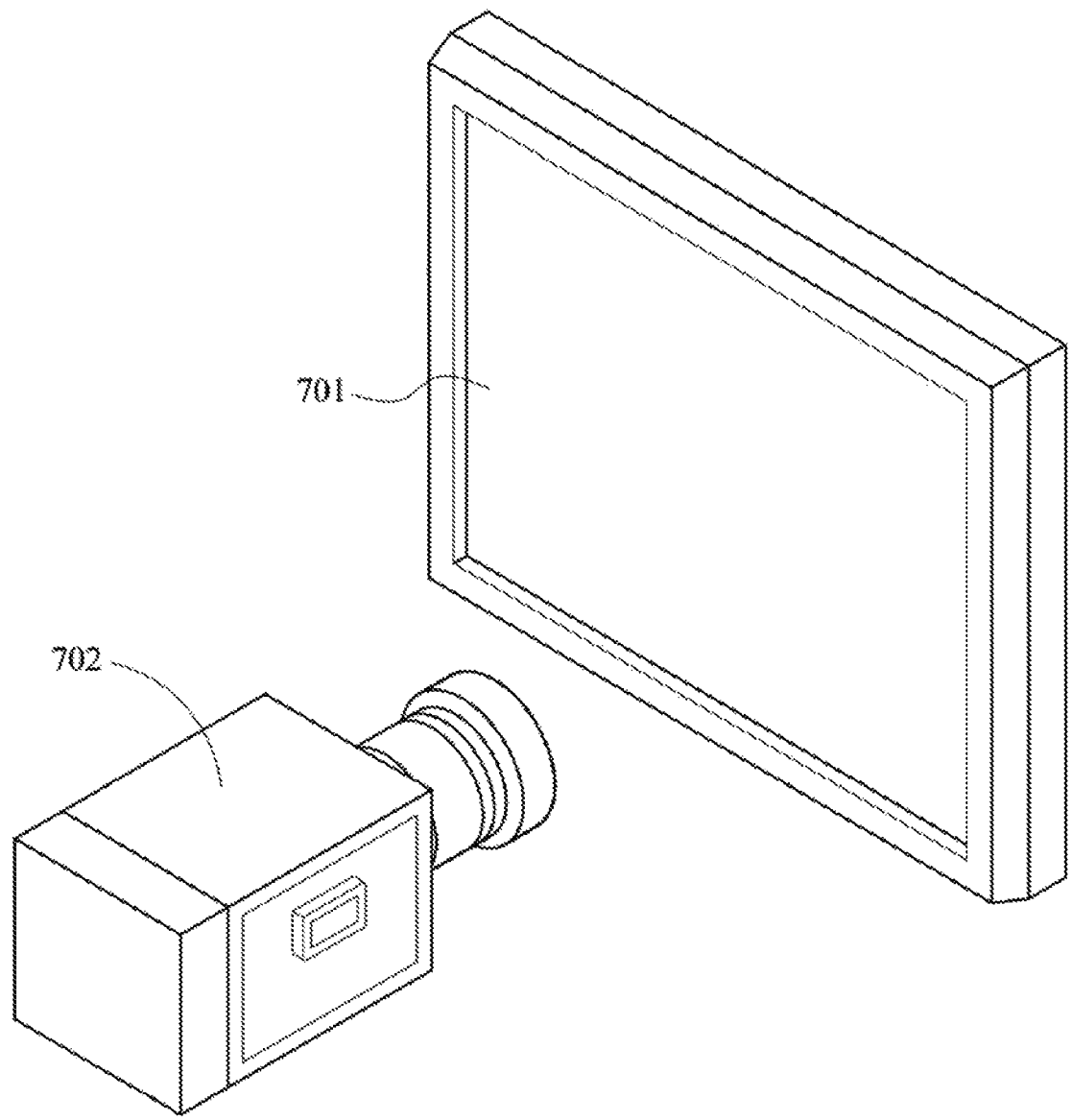
FIG. 7 is a schematic diagram of a restoring system according to an embodiment of this application.

FIG. 7 is a schematic diagram of a restoring system according to an embodiment of this application. As shown in FIG. 7, embodiments of this application further provide a restoring system 701, configured to provide a picture compensation signal for a display device. The restoring system includes an image capturing device 702 configured to obtain a luminance value of the display device, a calculating structure configured to calculate a sampling grayscale, and a structure for generating a picture compensation signal.

In an embodiment of this application, an image capturing device 702 is further included to obtain a partition luminance value of a display partition.

In an embodiment of this application, an image capturing device 702 is further included to obtain a highest grayscale center luminance value of an all-white screen, a lowest center luminance value of an all-black screen, and a region luminance value of the display device.

In an embodiment of this application, the reference luminance value is a predefined value set according to a system or set independently by a user.

In an embodiment of this application, the default value is a predefined value set according to a system or set independently by a user.

In an embodiment of this application, if the luminance difference value is less than the default value, the display partition is at the ideal luminance value and the compensation value is 0.

In an embodiment of this application, the compensation value is set to be 0 by the processing module, and is not calculated by means of the calculating module, so as to reduce the time for calculating the compensation value.

In an embodiment of this application, if the luminance difference value exceeds the default value, the calculating module calculates the compensation value, and the processing module adjusts the partition luminance value of a mura region.

In an embodiment of this application, by example of the existing demura technology mostly used in a 4K display screen (Ultra HD; UHD) having a resolution of 3840*2160 pixels, a current minimum compensation unit is 8*8 pixels. That is, one compensation point is obtained every eight pixels in both the horizontal direction and the vertical direction. By using the compensation point as a reference, compensation data for each pixel is obtained by mathematic operation in actual application. In the current method, a mura region and a non-mura region are not distinguished. Therefore, the total number of compensation points is 481*271, and compensation data for each point is 12 bits. Thus, the total amount of data to be calculated is 481*271*12=1.49 Megabyte (Mb). In the embodiments of this application, a mura region and a non-mura region are determined, to effectively reduce the calculation time for the non-mura region.

In view of the above, this application provides a display, the display comparing a luminance difference value of each region to be compensated with that of a reference point and setting the compensation value of a region having a relatively small difference to be 0, so as to reduce the total amount of calculation data of demura, so that the calculation time can be reduced.

This application further provides a sampling grayscale of demura selected dynamically for a display, and a most precise compensation effect is achieved by detecting grayscales having relatively obvious mura and then setting the sampling grayscale according to the grayscales.

With increasingly mature manufacturing capability and technology of high resolution screens, the mura region also becomes smaller. Consumption of operational time is quite large for conventional demura because compensation calculation with respect to a whole screen needs to be performed. It is extremely wasteful to obtain an extremely small mura with a great amount of operational time. By means of the method for reducing calculation time for demura provided in this application, a mura region can be found rapidly and calculation is performed with respect to the mura region, so that the amount of calculation can be reduced effectively, and also the time needed for calculating a compensation value during reduction of demura.

Terms such as "in some embodiments" and "in various embodiments" are repeatedly used. Usually, the terms do not refer to a same embodiment; but they may also refer to a same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A method for generating a picture compensation signal, comprising the following steps:
   obtaining, by means of an image capturing device, a grayscale center luminance value of a display device;
   setting, by means of a calculating module, a first grayscale percentage value and adjusting luminance of the display device according to the first grayscale percentage value;
   obtaining, by means of the image capturing device, a first region luminance value of the display device according to the first grayscale percentage value;

obtaining, by means of a luminance difference detection module, a luminance difference value according to a highest grayscale center luminance value and the first region luminance value;

determining, by means of a difference determining module, whether the luminance difference value is less than a default value;

if the luminance difference value is less than the default value, setting, by means of the calculating module, a grayscale percentage value and obtaining a second grayscale percentage value;

replacing, by means of a processing module, the first grayscale percentage value with the second grayscale percentage value; and if the luminance difference value exceeds the default value, obtaining, by means of the processing module, the first grayscale percentage value as a sampling grayscale.

2. The method for generating a picture compensation signal according to claim 1, wherein the default value is a predefined value set according to a system.

3. The method for generating a picture compensation signal according to claim 1, wherein the default value is a predefined value set independently by a user.

4. The method for generating a picture compensation signal according to claim 1, wherein a grayscale percentage value reduced by means of the calculating module is a decrement set according to a system or set independently by a user.

5. The method for generating a picture compensation signal according to claim 1, wherein if the luminance difference value is less than the default value, reducing, by means of the calculating module, a grayscale percentage value and obtaining a second grayscale percentage value, to adjust the luminance of the display device.

6. The method for generating a picture compensation signal according to claim 5, wherein the second grayscale percentage value is used as the new first grayscale percentage value in replacement by means of the processing module.

7. The method for generating a picture compensation signal according to claim 6, comprising: after obtaining the region luminance value by means of the image capturing device and calculating the luminance difference value, again determining whether the luminance difference value is less than the default value.

8. The method for generating a picture compensation signal according to claim 1, wherein a grayscale percentage value increased by means of the calculating module is an increment set according to a system.

9. The method for generating a picture compensation signal according to claim 1, wherein a grayscale percentage value increased by means of the calculating module is an increment set independently by a user.

10. The method for generating a picture compensation signal according to claim 1, wherein if the luminance difference value is less than the default value, increasing, by means of the calculating module, a grayscale percentage value and obtaining a second grayscale percentage value, to adjust the luminance of the display device.

11. The method for generating a picture compensation signal according to claim 10, wherein the second grayscale percentage value is used as the new first grayscale percentage value in replacement by means of the processing module.

12. The method for generating a picture compensation signal according to claim 11, comprising: after obtaining the region luminance value by means of the image capturing device and calculating the luminance difference value, again determining whether the luminance difference value is less than the default value.

13. A structure for generating a picture compensation signal, comprising:
   a calculating module, configured to set a grayscale percentage value and adjust luminance of a display device;
   a luminance difference detection module, configured to obtain a luminance difference value according to a highest grayscale center luminance value and also a lowest grayscale center luminance value and a corresponding region luminance value;
   a difference determining module, configured to determine whether the luminance difference value is less than a default value; and
   a processing module, configured to replace the grayscale percentage value, and obtain a sampling grayscale according to the grayscale percentage value.

14. The structure for generating a picture compensation signal according to claim 13, wherein the luminance difference detection module is configured to obtain, by means of an image capturing device, a highest grayscale center luminance value of an all-white screen, a lowest grayscale center luminance value of an all-black screen, and a region luminance value of the display device.

15. A restoring system, configured to provide a picture compensation signal to a display device, wherein the restoring system comprises:
   an image capturing device, configured to obtain a luminance value of the display device;
   a calculating structure, configured to calculate a sampling grayscale; and
   a structure for generating a picture compensation signal, wherein the structure for generating a picture compensation signal comprises:
   a calculating module, configured to set a grayscale percentage value and adjust luminance of a display device;
   a luminance difference detection module, configured to obtain a luminance difference value according to a highest grayscale center luminance value and also a lowest grayscale center luminance value and a corresponding region luminance value;
   a difference determining module, configured to determine whether the luminance difference value is less than a default value; and
   a processing module, configured to replace the grayscale percentage value, and obtain a sampling grayscale according to the grayscale percentage value.

16. The restoring system according to claim 15, wherein the luminance difference detection module is configured to obtain, by means of an image capturing device, a highest grayscale center luminance value of an all-white screen, a lowest grayscale center luminance value of an all-black screen, and a region luminance value of the display device.

* * * * *